United States Patent [19]

Itoh et al.

[11] 4,201,698
[45] May 6, 1980

[54] RUBBER COMPOSITIONS

[75] Inventors: Kunio Itoh, Annaka; Toshimichi Oshima, Takasaki, both of Japan

[73] Assignee: Shin-Etsu Chemical Co., Ltd., Japan

[21] Appl. No.: 937,273

[22] Filed: Aug. 28, 1978

[30] Foreign Application Priority Data

Aug. 30, 1977 [JP] Japan ............................... 52/103830
Jun. 2, 1978 [JP] Japan ................................. 53/66344

[51] Int. Cl.$^2$ ...................... C08L 7/00; C08L 9/00; C08L 19/00; C08L 83/06
[52] U.S. Cl. ................................. 260/3; 260/37 SB; 260/37 N; 260/37 R; 260/42.26; 525/102; 525/104; 525/105; 525/106; 525/403; 525/474; 525/453; 525/477
[58] Field of Search ............... 260/42.26, 827, 3, 825, 260/37 SB; 526/29; 525/102, 105

[56] References Cited

U.S. PATENT DOCUMENTS

| | | | |
|---|---|---|---|
| 3,021,292 | 2/1962 | Hurd et al. | 260/827 X |
| 3,227,777 | 1/1966 | Safford | 260/827 |
| 4,044,037 | 8/1977 | Mui et al. | 526/29 X |
| 4,070,414 | 1/1978 | Falender et al. | 260/827 X |
| 4,104,322 | 8/1978 | Snavely | 260/827 |
| 4,113,696 | 9/1978 | Williams et al. | 260/37 SB X |

*Primary Examiner*—Wilbert J. Briggs, Sr.
*Attorney, Agent, or Firm*—McGlew & Tuttle

[57] ABSTRACT

Rubber compositions curable to rubbery elastomers by heating are provided, in which co-vulcanization of an organic rubber, e.g. natural rubber or an organic synthetic rubber and an organopolysiloxane rubber can be effected to a satisfactory degree, whereas such co-vulcanization in the prior art involves several difficult problems. The characterizing components in the rubber composition are the organopolysiloxane which has at least two functional units of either mercapto groups or aliphatically unsaturated linkages in the molecule and a specific organosilicon compound which has a polysulfide linkage and one or more silicon-bonded hydroxy groups or hydrolyzable atoms or groups in the molecule.

6 Claims, No Drawings

RUBBER COMPOSITIONS

BACKGROUND OF THE INVENTION

The present invention relates to a rubber composition which is cured by heating into a rubbery elastomer having excellent mold-releasability, thermal stability, anti-freeze resistance and anti-weathering resistance along with excellent mechanical strengths and electric properties not only at ordinary temperatures, but also at elevated temperatures as well. In particular, the invention relates to a rubber composition comprising a blend of natural rubber or an organic synthetic rubber and a silicone rubber capable of forming a cured rubbery elastomer.

Several types of commercially available silicone rubbers curable by heating into rubbery elastomers are hitherto known. The most conventional types are silicone rubbers curable by crosslinking with an organic peroxide and those curable by addition reaction to crosslink formation between aliphatically unsaturated organic groups and silicon-bonded hydrogen atoms in the presence of platinum or a platinum compound as a catalyst to accelerate the addition reaction.

It is well known that silicone rubbers are generally much better than other organic synthetic rubbers in their heat resistance and low-temperature behaviors. The silicone rubbers, however, are disadvantaged by their relatively poor mechanical properties and expensiveness, compared to the other organic synthetic rubbers. Therefore, it has been one of the largest requirements in rubber technology to obtain a rubber composition capable of giving elastomers which have the same excellent heat resistance and low-temperature behaviors as the silicone rubbers, and also the same high mechanical properties as ordinary organic rubbers. Such requirement naturally led to an attempt to blend the silicone rubber with the organic rubber.

It is an established knowledge in the art, however, that co-vulcanization of a blend of a silicone rubber of the above-mentioned types, with natural rubber or an organic synthetic rubber, is very difficult and can hardly give a rubbery elastomer with superior properties. For example, an ethylene-propylene copolymeric rubber was blended with an alkenyl-containing organopolysiloxane and subjected to co-vulcanization with an organic peroxide as the vulcanizing agent. However, the thus-obtained elastomers had rather low tensile strength, say, around 30 to 45 kg/cm², far lower than the values possessed by organic synthetic rubbers (see U.S. Pat. No. 3,227,777). The inventors of the present invention had previously proposed a rubber blend composed of an organic rubber and a mercapto group-containing organopolysiloxane in a copending U.S. patent application Ser. No. 877,822, though their blend had insufficient improvements in the mechanical properties and thermal stability.

A blend of natural rubber or an organic synthetic rubber and a silicone rubber of the peroxide-cure type can be co-vulcanized, but the resultant products will come to possess remarkably lowered thermal stability and physical properties, e.g. mechanical strengths, so that they are hardly suitable for practical use.

In a blend of natural rubber or an organic synthetic rubber with a silicone rubber curable by the mechanism of the addition reaction, on the other hand, the catalytic activity of the platinum catalyst is liable to be lost by poisoning with trace amounts of various compounds formulated in the above-mentioned organic rubber, such as sulfur compounds, amine compounds and phosphorus compounds, as well as compounds of metals, e.g. tin, zinc, bismuth, cobalt and the like, resulting in a decreased practical value of the rubber blend compositions.

SUMMARY OF THE INVENTION

The object of the present invention is, therefore, to provide a rubber composition based on a blend of a silicone rubber and natural rubber or an organic synthetic rubber capable of being co-vulcanized into a rubbery elastomer with improved properties.

The rubber composition of the present invention, which has been completed as a result of extensive investigations by the inventors to achieve the above object, comprises a silicone rubber component which is an organopolysiloxane having at least two functional units selected from the class consisting of mercapto group and aliphatically unsaturated linkages in the molecule in combination with a sepcific organosilicon compound as well as a reinforcing filler, as will be described hereinafter. It has been established that the cured rubbery elastomers of the rubber composition of the present invention have excellent mechanical strengths which are sufficient for practical use along with much improved thermal stability and anti-freeze resistance, compared to natural rubber and organic synthetic rubbers, as well as excellent properties even at elevated temperatures as at ordinary temperatures.

The rubber composition of the present invention comprises (a) 100 parts by weight of a rubber blend composed of
   (a-1) from 50 to 95% by weight of natural rubber or an organic synthetic rubber and
   (a-2) from 50 to 5% by weight of an organopolysiloxane expressed by the average unit formula $$R_aSiO_{(4-a/2)} \qquad (I)$$

where R is a substituted or unsubstituted monovalent hydrocarbon group and a is a number from 1.98 to 2.05 inclusive, and having in the molecule at least two functional units selected from the class consisting of aliphatically unsaturated linkages and mercapto groups, (b) from 0.1 to 20 parts by weight of an organosilicon compound having in the molecule at least one polysulfide linkage and at least one hydroxy group directly bonded to the silicon atom or atoms and/or hydrolyzable atoms or groups, (c) from 5 to 200 parts by weight of a reinforcing siliceous filler having a specific surface area of at least 50 m²/g, and (d) from 0.1 to 10 parts by weight of a curing agent.

DETAILED DESCRIPTION OF THE PREFERRED EMBODIMENTS

The component (a) in the rubber composition of the present invention is a rubber blend composed of (a-1) natural rubber or an organic synthetic rubber other than silicone rubbers and (a-2) the organopolysiloxane expressed by the average unit formula (I) above. As the component (a-1), various kinds of known organic synthetic rubbers may be used, their examples being isoprene rubbers, styrene-butadiene rubbers, butadiene rubbers, butyl rubbers, butadiene-acrylonitrile rubbers, ethylene-propylene-diene terpolymer rubbers, ethylene-propylene rubbers, ethylene-vinyl acetate copolymer rubbers, chlorinated polyethylene rubbers, acrylic rubbers, chloroprene rubbers, urethane rubbers, polysulfide rubbers, chlorosulfonated polyethylene rubbers, epichlorohydrine rubbers, isobutylene-isoprene rubbers, and the like. Preferred among the organic rubbers from the standpoint of easiness in co-vulcanization are those which do not contain halogen atoms or, in particular, dienic rubbers, such as styrene-butadiene rubbers, butadiene rubbers, ethylene-propylene rubbers, ethylene-propylene-diene terpolymer rubbers, butadiene-acrylonitrile rubbers, ethylene-vinyl acetate copolymer rubbers, and isobutylene-isoprene rubbers.

The organopolysiloxane as the component (a-2) in the composition of the present invention is expressed by the average unit formula (I) above, and necessarily has at least two functional units selected from aliphatically unsaturated linkages and mercapto groups (—SH) per molecule. The symbol R in the formula represents a substituted or unsubstituted monovalent hydrocarbon group exemplified by alkyl groups, such as methyl, ethyl, propyl, and butyl groups; aryl groups, such as phenyl and tolyl groups; and those groups obtained by replacing part of the hydrogen atoms in the above-named hydrocarbon groups with certain substituents, such as halogen atoms or cyano groups.

The above-mentioned aliphatically unsaturated linkages are involved in the molecules of the organopolysiloxane in the form of vinyl, allyl, cyclopentadienyl, 3-methacryloxypropyl groups and the like. The mercapto groups also mentioned above are usually bonded to the silicon atoms through divalent organic groups, such as alkylene existent, for example, in the groups HSCH$_2$—, HSCH$_2$CH$_2$—, or HSCH$_2$CH$_2$CH$_2$— where the mercapto groups are bonded to the silicon atoms through a linear-chained organic group, and in the group

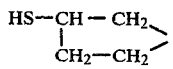

where the mercapto group is bonded to the carbon atom in a divalent hydrocarbon group of the heterocyclic structure formed with the silicon atom.

When the organopolysiloxane as the component (a-2) is highly viscous with gum-like consistency, it is desirable that from 0.1 to 1.0 mole % of the R groups are mercapto-substituted organic groups and/or aliphatically unsaturated groups. This is because a smaller content of the functional groups leads to an insufficient degree of co-vulcanization.

The organopolysiloxanes as the component (a-2) can readily be prepared by co-hydrolysis of a mixture of silanes composed of one or more hydrolyzable organosilanes having aliphatically unsaturated groups and/or one or more mercapto group-containing hydrolyzable organosilanes mixed in a suitable proportion, combined optionally with other hydrolyzable organosilanes having neither aliphatically unsaturated groups nor mercapto groups. Illustrative of the hydrolyzable organosilanes are aliphatic unsaturation-containing silanes, such as ViMeSiCl$_2$, (CH$_2$=CHCH$_2$)MeSiCl$_2$, and ViPhSiCl$_2$; mercapto group-containing silanes, such as (HSCH$_2$CH$_2$CH$_2$)MeSiCl$_2$, (HSCH$_2$)MeSiCl$_2$, (HSCH$_2$)$_2$SiCl$_2$, (HSCH$_2$CH$_2$CH$_2$)SiCl$_3$, (HSCH$_2$CH$_2$CH$_2$)Me$_2$SiCl, and

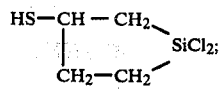

and organosilanes, free of both aliphatic unsaturation and mercapto groups, such as Me$_2$SiCl$_2$, PhMeSiCl$_2$, Ph$_2$SiCl$_2$, (C$_2$H$_5$)$_2$SiCl$_2$, (C$_3$H$_7$)MeSiCl$_2$, (CF$_3$CH$_2$CH$_2$)MeSiCl$_2$, (PhCH$_2$CH$_2$)—MeSiCl$_2$, PhSiCl$_3$, and MeSiCl$_3$. In the formulas symbols Me, Vi and Ph denote methyl, Vinyl and phenyl groups, respectively.

The co-hydrolysis product, which is a low molecular weight organopolysiloxane having a linear or cyclic molecular configuration, is then subjected to polymerization reaction at a temperature from room temperature to 70° C. for several to 48 hours under agitation in the presence of an acidic catalyst, such as sulfuric acid, phosphonitrile chloride, and trifluoromethane sulfonic acid, or a basic catalyst, such as potassium hydroxide, tetramethylammonium hydroxide, and tetrabutylhydroxysulfonium hydroxide.

It is an alternative way for the preparation of the organopolysiloxanes that each of the above-mentioned hydrolyzable organosilanes is separately hydrolyzed to form the corresponding low molecular weight polysiloxane and the resulting single-component organopolysiloxanes are blended in the desired proportions, followed by polymerization to give the desired high molecular weight organopolysiloxane.

In this way, for the preparation of the organopolysiloxanes, the degree of polymerization of the organopolysiloxane can adequately be adjusted by a method known in the art. Thus, it is possible to obtain an organopolysiloxane with a degree of polymerization widely ranging, say, corresponding to a consistency from oily fluid to gummy mass. It is, however, desirable that the degree of polymerization is at least 100 or, preferably, at least 500, if one intends to have the finally finished rubbery elastomers improved in their physical properties.

The blending ratio of the components (a-1) and (a-2) in the rubber blend (a) is desirably from 50 to 95% by weight of the former against from 50 to 5% by weight of the latter or, in particular, from 55 to 90% by weight of the former against 45 to 10% by weight of the latter. If the content of the component (a-2) is smaller than above, the object of the invention to obtain rubbery elastomers having improved thermal stability, compression set and other properties, can hardly be attained. On the other hand, if it is larger, the cured resultant elastomer products have poorer mechanical properties, notwithstanding some further improvements in thermal stability and oil resistance.

The organosilicon compound as the component (b) in the inventive composition serves not only to improve the dispersion of the reinforcing siliceous filler as the component (c) in the composition, but also to induce the resulting rubbery elastomer products to have suffcient mechanical strengths and thermal stability. The organosilicon compounds are characterized by having one or more polysulfide linkages

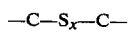

where x is an integer from 2 to 6, and also by one or more hydroxy groups directly bonded to the silicon atoms and/or hydrolyzable atoms or groups in the molecule. Illustrative of the hydrolyzable atoms or groups are halogen atoms, such as chlorine; alkoxy groups, such as methoxy, ethoxy and propoxy groups; alkenoxy groups, such as isopropenoxy group; and acyloxy groups, such as acetoxy group; oxime group; and aminoxy groups, among which the most preferred are methoxy, ethoxy, and isopropenoxy groups.

The molecular configuration of these organosilicon compounds may be a straight chain, branched chain or cyclic ring. It is, however, preferred that the compounds have a relatively low molecular weight because of their availability. Examples of the organosilicon compounds are those expressed by the following formulas, in which Me, Et and Bu denote methyl, ethyl and butyl groups, respectively.

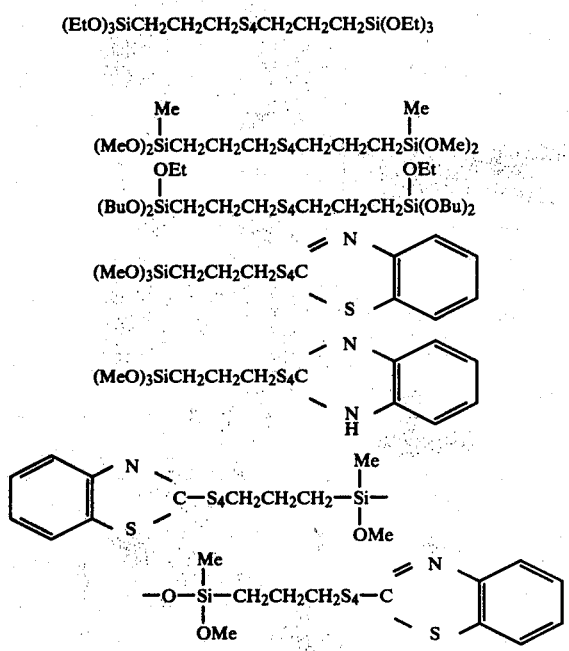

The organosilicon compound as the component (b) is used in an amount from 0.1 to 20 parts by weight or, preferably, from 1 to 10 parts by weight per 100 parts by weight of the rubber blend consisting of the natural rubber or an organic synthetic rubber as the component (a-1) and the organopolysiloxane as the component (a-2). This quantitywise limitation to the component (b) is due to the fact that smaller amounts work to impart insufficient mechanical strengths to the resultant cured rubbery elastomer products, while more amounts work to result in an excessively strong effect of plasticization as well as an excessively high density of crosslinks, leading also to insufficient mechanical strengths.

The reinforcing siliceous filler as the component (c) useful in the composition of the present invention must have a specific surface area of at least 50 m²/g or, preferably, at least 100 m²/g. Examples of the reinforcing siliceous fillers are precipitated silica, fumed silica, calcium silicate, magnesium silicate, and aluminum silicate. These reinforcing siliceous fillers may be used, if necessary, in combination with other non-reinforcing or non-siliceous fillers, such as carbon black, diatomaceous earth, metal oxides, e.g. titanium dioxide, aluminum oxide and iron oxide, graphite powder, calcium carbonate, and certain organic fillers.

The amount of the reinforcing siliceous filler to be formulated in the composition is in the range from 5 to 200 parts by weight or, preferably, from 5 to 100 parts by weight per 100 parts by weight of the rubber blend of the natural rubber or the organic synthetic rubber as the component (a-1) and the organopolysiloxane as the component (a-2). Any smaller or larger amounts of the filler than above result in imparting insufficient mechanical strengths to cured rubbery elastomer products.

The curing agent as the component (d) useful in the composition of the invention may be selected from the group consisting of sulfur, sulfur-containing organic compounds, such a zinc dibutyldithiocarbamate, dibenzothiazyl disulfide, 2-mercaptobenzothiazole, tetramethylthiuram monosulfide, tetramethylthiuram disulfide, dipentamethylenethiuram tetrasulfide, and 2-mercaptobenzimidazole, and organic peroxides, such as benzoyl peroxide, 2,4-dichlorobenzoyl peroxide, dicumyl peroxide, 2,5-dimethylbis(2,5-tert-butylperoxy)hexane, di-tert-butyl peroxide, tert-butyl perbenzoate, 1,1-di-tert-butyl-peroxy-3,3,5-trimethylcyclohexane, 1,3-bis(-tert-butylperoxyisopropyl) benzene, and tert-butylperoxyisopropyl carbonate. A single curing agent or mixture of two or more of the curing agents can be used according to need depending on the kinds of the rubbery components (a-1) and (a-2).

The amount of the curing agent as the component (d) in the composition must be in the range from 0.1 to 10 parts by weight per 100 parts by weight of the rubber blend of the components (a-1) and (a-2). Any smaller amounts cannot give sufficient curing effect to the composition, while excessively large amounts result in giving poorer mechanical strengths and thermal stability to the cured products.

The rubber composition of the present invention may readily be prepared by uniformly blending the above-mentioned components (a) to (d) by a conventional means using a Banbury mixer, kneader, two-roll mill, or the like. It is optional if necessary, that the composition under blending is heated in order to reduce moisture content in the ingredients, espeically, the filler or that the composition thus blended is subjected to aging treatment.

The rubber composition prepared can be molded and vulcanized to form cured rubbery elastomers, using conventional rubber processing techniques, such as press molding, transfer molding, extrusion molding, injection molding, calendering, and the like. The elastomers thus obtained are satisfactory with respect, for example, to rubbery elasticity, thermal stability, oil resistance, weathering resistance, compression set, permanent set, and electric, mechanical and other properties. By virtue of this, the rubber compositions of the present invention are suitable for a very wide range of application including the manufacture of rubber belts, rubber rolls, gaskets, packings, rubber hoses, and the like.

It is optional that various additives may be included in the rubber composition of the invention. Illustrative of the additives are coloring agents, aging retarders, process oils, zinc white, and stearic acid as well as carbon-functional silanes, such as methyltrimethoxysilane, dimethyldimethoxysilane, diphenylsilane diol, phenyltrimethoxysilane, dimethyldiacetoxysilane and phenylmethyldimethoxysilane, which are used as the dispersing aid, and vinyltrimethoxysilane, vinyl tris(2-methoxyethoxy)silane, mercaptopropyl trimethoxysilane, 3-methacryloxypropyl trimethoxysilane, 3-aminopropyl tri-methoxysilane, 3-aminopropyl triethoxysilane and 3-glycidoxypropyl trimethoxysilane, which are used as the reinforcing agent to increase bonding strength between the filler and the rubber polymer; the partial hydrolyzates or cohydrolyzates of the carbon-functional silanes; dipentamethylenethiuram pentasulfide; 2-mercaptobenzo-thiazole; N-methyl-N'-4-dinitrosoaniline; dinitrosobenzene; oxime compounds, such as p-benzoquinone oxime and 4,4'-dibenzoylquinone dioxime; and polyfunctional unsaturated monomeric compounds, such as ethyleneglycol dimethacrylate, diallylphthalate, triallyl cyanurate, diethyleneglycol dimethacrylate, divinyl benzene, trimethylolpropane trimethacrylate, and liquid polybutadiene, which are used as the co-agent for vulcanization. These additives are used to improve vulcanization characterstics and various properties of the composition, according to need.

The following examples will further illustrate the compositions of the present invention. In the examples parts are all parts by weight, and a superscript asterisk given to any one of experiment numbers is indicative of comparative purposes.

EXAMPLE 1. (EXPERIMENTS NO. 1 TO NO. 6)

Compositions were prepared by uniformly blending on a two-roll mill 70 parts of an EPDM rubber EP-43 (product of Nippon EP Rubber Co.) having an iodine value of 6, 30 parts of an organopolysiloxane composed of 0.5 mole % of 3-mercaptopropylmethylsiloxane units and 99.5 mole % of dimethylsiloxane units and having a degree of polymerization of about 6,000, 55 parts of a precipitated silica filler Nipsil VN$_3$ (product of Nippon Silica Kogyo Co.) having a specific surface area of about 230 m$^2$/g, 10 parts of zinc white, 1.5 parts of stearic acid, and 15 parts of a naphthenic series process oil R-1000 (product of Nippon Kogyo Co.), together with the varied amounts of bis(trimethoxysilylpropyl) tetrasulfide as indicated in Table I.

Into 100 parts each composition prepared above was added 2.5 parts of a pasty mixture containing 40% by weight of dicumyl peroxide in a silicone fluid (hereinafter called as DCP-40) or a mixture of 0.3 part of sulfur, 0.6 part of 2-mercaptobenzothiazole and 0.9 part of tetramethylthiuram sulfide (hereinafter called as S-M-TS), using a two-roll mill. The resultant composition was shaped into a sheet 2 mm thick.

The sheets thus formed were subjected to stepwise curing, first at 160° C. for 30 minutes under a 100 kg/cm$^2$ pressure and then at 150° C. for 2 hours, to finally form elastomeric sheets, of which hardness, ultimate elongation, tensile strength and tear strength were determined. The results are set out in Table I.

EXAMPLE 2. (EXPERIMENTS NO. 7 AND NO. 8)

A composition was prepared by uniformly blending on a two-roll mill 70 parts of an EPDM rubber EP-24 having an iodine value of 15, 30 parts of an organopolysiloxane composed of 0.8 mole % of 3-mercaptopropylmethylsiloxane units, 99.18 mole % of dimethylsiloxane units and 0.02 mole % of trimethylsiloxy units, 10 parts of a process oil Sunpar 2280 (product of Nippon Sun Oil Co.), 5 parts of zinc white Azo (product of Seido Kagaku Kogyo Co.), 1 part of stearic acid, 50 parts of a precipitated silica filler Nipsil VN having a specific surface area of about 230 m$^2$/g, 2 parts of diethylene glycol, 1.5 parts of sulfur, 0.5 part of 2-mercaptobenzothiazole and 1.5 parts of tetramethylthiuram sulfide.

A portion of the above prepared composition as such (Experiment No. 7) and another portion to which 1.5% by weight of bis(trimethoxysilypropyl) tetrasulfide was added (Experiment No. 8) were each fabricated into sheets 2 mm thick by heating first at 160° C. for 20 minutes under a 100 kg/cm$^2$ pressure and then at 150° C. for 2 hours. The resultant sheets were examined for hardness, ultimate elongation, tensile strength and tear strenth. The results are set out in Table II.

Table II

| Experiment No. | 7* | 8 |
| --- | --- | --- |
| Hardness (JIS) | 76 | 76 |
| Ultimate elongation, % | 227 | 332 |
| Tensile strength, kg/cm$^2$ | 67 | 101 |
| Tear strength, kg/cm | 31 | 30 |

EXAMPLE 3. (EXPERIMENTS NO. 9 AND NO. 10)

A composition was prepared by uniformly blending on a two-roll mill 70 parts of an EPDM rubber EP-43 having an iodine value of 6, 30 parts of an organopolysiloxane having an average degree of polymerization of about 2,000 and composed of 0.5 mole % of 3-mercaptopropylmethylsiloxane units and 99.5 mole % of dimethylsiloxane units, 10 parts of a process oil R-1000, 5 parts of zinc white Azo, 1 part of stearic acid, 50 parts of a precipitated silica filler Nipsil VN$_3$ with a specific surface area of bout 230 m$^2$/g, 2 parts of diethylene glycol and 2 parts of DCP-40.

A portion of the above prepared composition as such (Experiment No. 9) and another portion to which 1.5% by weight of bis(triethoxysilylpropyl)tetrasulfide was added (Experiment No. 10) were each fabricated into sheets 2 mm thick by heating first at 160° C. for 30 minutes under a 100 kg/cm$^2$ pressure and then at 180° C. for 1 hour. The hardness, ultimate elongation, tensile strength and tear strength of the resultant sheets were examined, with the results as set out in Table III.

Table I

| Experiment No. | 1* | 2* | 3 | 4 | 5 | 6 |
| --- | --- | --- | --- | --- | --- | --- |
| Bis(trimethoxy-silylpropyl) tetrasulfide, parts | 0 | 0 | 1 | 1 | 3 | 3 |
| Curing agent | DCP-40 | S-M-TS | DCP-40 | S-M-TS | DCP-40 | S-M-TS |
| Hardness (JIS) | 63 | 60 | 66 | 64 | 70 | 68 |
| Ultimate elongation, % | 880 | 985 | 712 | 890 | 629 | 778 |
| Tensile strength, kg/cm$^2$ | 73 | 71 | 102 | 87 | 109 | 96 |
| Tear strength, kg/cm | 48 | 47 | 43 | 41 | 39 | 42 |

Table III

| Experiment No. | 9* | 10 |
|---|---|---|
| Hardness (JIS) | 66 | 68 |
| Ultimate elongation, % | 810 | 696 |
| Tensile strength, kg/cm$^2$ | 73 | 120 |
| Tear strength, kg/cm | 29 | 45 |

EXAMPLE 4. (EXPERIMENTS NO. 11 AND NO. 12)

A composition was prepared by uniformly blending on a two-roll mill 70 parts of an acrylonitrile-butadiene rubber JSR N232S (product of Nippon Gosei Gomu Co.), 30 parts of the same organopolysiloxane as used in Example 3, 5 parts of zinc white, 1 part of stearic acid, 7 parts of a precipitated silica filler Nipsil VN3 having a specific surface area of about 230 m$^2$/g, 55 parts of an SRF carbon black, 1 part of sulfur, 0.5 part of tetramethylthiuram sulfide and 15 parts of dioctyl phthalate.

A portion of the above prepared composition as such (Experiment No. 11) and another portion to which 1.4% by weight of bis(triethoxysilylpropyl) tetrasulfide was added (Experiment No. 12) were each fabricated into sheets 2 mm thick by heating at 160° C. for 20 minutes under a 100 kg/cm$^2$ pressure. The thus obtained sheets were examined for hardness, ultimate elongation and tensile strength. The results are set out in Table IV.

Table IV

| Experiment No. | 11* | 12 |
|---|---|---|
| Hardness (JIS) | 64 | 65 |
| Ultimate elongation, % | 470 | 530 |
| Tensile strength, kg/cm$^2$ | 83 | 121 |

EXAMPLE 5. (EXPERIMENTS NO. 13 TO NO. 16)

Compositions were prepared by uniformly blending on a pressure kneader 70 parts of an EPDM rubber EP-43 having an iodine value of 6, 30 parts of an organopolysiloxane having a degree of polymerization of about 3,000 and composed of 0.5 mole % of methylvinylsiloxane units, 96.5 mole % of dimethylsiloxane units and 3 mole % of Ph$_2$SiO units, 55 parts of a precipitated silica filler having a specific surface area of about 230 m$^2$/g, 10 parts of zinc white, 1 part of stearic acid, 6 parts of an α,ω-dihydroxydimethylpolysiloxane with a viscosity of 20 centistokes at 25° C., 8 parts of a naphthenic process oil R-1000 and 1 part of 2-mercaptobenzimidazole, toglther with the varied amounts of a polysulfide compound expressed by the formula (EtO)$_3$SiCH$_2$CH$_2$CH$_2$S$_4$CH$_2$CH$_2$CH$_2$Si(OEt)$_3$ as indicated in Table V.

After having been aged at room temperature for 7 days, 100 parts of each of the above-prepared composition was mixed with 3.5 parts of DCP-40, and the mixture was shaped into a sheet 2 mm thick, using a two-roll mill. The sheets, thus formed were subjected to curing by heating first at 160° C. for 20 minutes under a 100 kg/cm$^2$ pressure and then at 150° C. for 2 hours. Hardness, ultimate elongation, tensile strength and tear strength were determined for the sheets as thus heat-cured and also as having been kept at 180° C. for 10 days or at 150° C. for 30 days. The results are set out in Table V.

Table V

| Experiment No. | | 13* | 14 | 15 | 16 |
|---|---|---|---|---|---|
| Polysulfide compound, parts | | 0 | 1 | 2 | 3 |
| As cured | Hardness (JIS) | 64 | 66 | 70 | 70 |
| | Ultimate elongation, % | 890 | 780 | 637 | 630 |
| | Tensile strength, kg/cm$^2$ | 69 | 104 | 120 | 123 |
| After 10 days at 180° C. | Hardness (JIS) | 92 | 78 | 78 | 80 |
| | Ultimate elongation, % | (a) | 160 | 220 | 210 |
| | Tensile strength, kg/cm$^2$ | (a) | 63 | 70 | 77 |
| After 30 days at 150° C. | Hardness (JIS) | 88 | 75 | 77 | 80 |
| | Ultimate elongation, % | 140 | 270 | 380 | 360 |
| | Tensile strength, kg/cm$^2$ | 54 | 74 | 83 | 89 |

(a): Too weak to be determined.

EXAMPLE 6. (EXPERIMENTS NO. 17 TO NO. 20)

Compositions were prepared by uniformly blending on a two-roll mill a vinyl acetate-ethylene copolymer Evathlene 410-P (product of Dainippon Ink Kagaku Co.), a methylvinylpolysiloxane composed of 0.7 mole % of methylvinylsiloxane units and 99.3 mole % of dimethylsiloxane units (hereinafter called as methylvinylpolysiloxane-I), a polysulfide compound expressed by the formula (MeO)$_3$SiCH$_2$CH$_2$CH$_2$S$_4$CH$_2$CH$_2$CH$_2$Si(OMe)$_3$, a fumed silica filler Aerosil 200 (product of Nippon Aersil Co.) having a specific surface area of about 200 m$^2$/g, magnesium silicate Mistron Vapor (product of Nikon Mistron Co.), calcium carbonate, an α,ω-dihydroxymethylphenylpolysiloxane having a viscosity of 40 centistokes at 25° C., zinc white, stearic acid, an aging retarder Nocrac 224 (product of Ohuchi Shinko Kagaku Co.), triallyl cyanurate, and a methylvinylpolysiloxane expressed by the formula

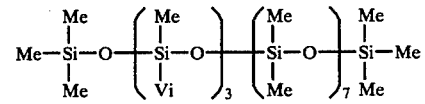

(hereinafter called as methylvinylpolysiloxane-II), all in the amounts as indicated in Table VI.

Into 100 parts of each compound above prepared was added 4 parts of DCP-40. The resultant compositions were then fabricated into elastomeric sheets 2 mm thick by press molding at 165° C. for 10 minutes under a 100 kg/cm$^2$ pressure, followed by heating at 150° C. for 2 hours. Ultimate elongation and tensile strength were determined for the sheets as thus heat-cured and also as having been kept at 150° C. for 10 days or at 170° C. for 7 days. Compression set was determined for the sheets of the former category. The results are set out in Table VI.

Table VI

| Experiment No. | 17* | 18 | 19 | 20* |
|---|---|---|---|---|
| Vinyl acetate-ethylene copolymer, parts | 65 | 65 | 65 | 100 |
| Methylvinylpolysiloxane-I, parts | 35 | 35 | 35 | 0 |
| Fumed silica filler, parts | 10 | 10 | 10 | 0 |
| Magnesium silicate, parts | 35 | 35 | 35 | 40 |
| Calcium carbonate, parts | 50 | 50 | 50 | 60 |
| Polysulfide compound, parts | 0 | 2 | 2 | 0 |
| Methylphenylpolysiloxane, parts | 5 | 5 | 5 | 0 |
| Zinc white, parts | 5 | 5 | 5 | 5 |
| Stearic acid, parts | 1 | 1 | : | 1 |
| Triallyl cyanurate, parts | 2 | 2 | 0 | 3 |
| Methylvinylpolysiloxane-II, parts | 0 | 0 | 2 | 0 |
| Ultimate elongation, % | 500 | 430 | 415 | 410 |

Table VI-continued

| Experiment No. | | 17* | 18 | 19 | 20* |
|---|---|---|---|---|---|
| As cured | Tensile strength, kg/cm² | 75 | 82 | 90 | 90 |
| | Compression set, % | | | | |
| | (105° C., 22 hrs.) | 13 | 18 | 15 | 35 |
| After 10 days at 150° C. | Ultimate elongation, % | 293 | 350 | 340 | 200 |
| | Tensile strength, kg/cm² | 70 | 85 | 90 | 72 |
| After 7 days at 170° C. | Ultimate elongation, % | 275 | 286 | 320 | 170 |
| | Tensile strength, kg/cm² | 73 | 80 | 96 | 67 |

EXAMPLE 7. (EXPERIMENTS NO. 21 AND NO. 22)

A composition was prepared by uniformly blending on a two-roll mill 70 parts of an acrylonitrile-butadiene copolymeric rubber N230S (product of Nippon Gosei Gomu Co.) having a Mooney viscosity $ML_{1+4}(100°\ C.)$ 56 and containing 35% by weight of acrylonitrile, 30 parts of a methylvinylpolysiloxane having a degree of polymerization of about 3,000 and composed of 1 mole % of methylvinylsiloxane units and 99 mole % of dimethylsiloxane units, 7 parts of a fumed silica filler having a specific surface area of about 130 m²/g, 55 parts of an SRF carbon black, 5 parts of zinc white, 1 part of stearic acid, 5 parts of an $\alpha,\omega$-dihydroxymethylphenylpolysiloxane with a viscosity of 100 centistokes at 25° C., 10 parts of dioctyl phthalate and 2 parts of a polysulfide compound expressed by the formula $(EtO)_2(Me)SiCH_2CH_2CH_2S_4CH_2CH_2CH_2Si(Me)(OEt)_2$.

Into 100 parts of the above-prepared compositions was added 3.5 parts of DCP-40 in a uniform manner to form a new composition. The resultant composition was shaped into a sheet 2 mm thick by heating at 160° C. for 30 minutes (Experiment No. 22).

In comparison, another composition was prepared with the same ingredients except that the polysulfide compound was omitted, and using the composition a similar sheet was formed (Experiment No. 21). Herdness, ultimate elongation, tensile strength and/or permanent set were dstermined for these sheets as thus heat-cured and also as having been kept at 120° C. for 7 days. The results are set out in Table VII.

Table VII

| Experiment No. | | 21* | 22 |
|---|---|---|---|
| Polysulfide compound, parts | | 0 | 2 |
| | Hardness (JIS) | 57 | 60 |
| | Ultimate elongation, % | 510 | 470 |
| As cured | Tensile strength, kg/cm² | 94 | 136 |
| | Permanent set | | |
| | (100° C., 70 hours) | 18 | 20 |
| After 7 days at 120° C. | Hardness (JIS) | 65 | 63 |
| | Ultimate elongation, % | 316 | 380 |
| | Tensile strength, kg/cm² | 80 | 122 |

EXAMPLE 8. (EXPERIMENTS NO. 23 AND NO. 24)

Compositions were prepared by uniformly blending on a pressure kneader 70 parts of the same EPDM rubber as used in Example 5, 30 parts of an organopolysiloxane composed of 0.15 mole % of methylvinylsiloxane units, 0.2 mole % of 3-mercaptopropylmethylsiloxane units and 99.65 mole % of dimethylsiloxane units and having a degree of polymerization of about 5,000, 55 parts of a precipitated silica filler Nipsil VN₃ having a specific surface area of about 230 m²/g, 5 parts of zinc white, 1 part of stearic acid, 2 parts of $\alpha,\omega$-dihydroxymethylphenylpolysiloxane having a viscosity of 40 centistokes at 25° C., 10 parts of the same process oil as used in Example 5, and 1 part of 2-mercaptobenzimidazole together with the varied amounts of a polysulfide compound expressed by the formula $(MeO)_3SiCH_2CH_2CH_2S_4CH_2CH_2CH_2Si(OMe)_3$ as indicated in Table VIII.

After having been aged at room temperature for 7 days, 100 parts of each composition above prepared was mixed with 4 parts of DCP-40, using a two-roll mill. The resultant mixture was shaped into a sheet 2 mm thick. The sheets thus formed were subjected to press curing by heating first at 160° C. for 20 minutes under a 100 kg/cm² pressure and then at 150° C. for 2 hours. Hardness, ultimate elongation and tensile strength determined for these elastomer sheets as thus heat-cured and also as having been kept at 150° C. for 10 days. The results are set out in Table VIII.

Table VIII

| Experiment No. | | 23 | 24 |
|---|---|---|---|
| Polysulfide compound, parts | | 0.5 | 2.0 |
| | Hardness (JIS) | 68 | 66 |
| As cured | Ultimate elongation, % | 300 | 330 |
| | Tensile strength, kg/cm² | 90 | 110 |
| After 10 days at 150° C. | Hardness (JIS) | 74 | 74 |
| | Ultimate elongation, % | 190 | 240 |
| | Tensile strength, kg/cm² | 74 | 110 |

EXAMPLE 9. (EXPERIMENTS NO. 25 TO NO. 30)

Compositions were prepared each by uniformly blending on a two-roll mill an EPDM rubber EP-43, the same organopolysiloxane as used in Example 1 (Experiments No. 25 to No. 29) or the same organopolysiloxane as used in Example 5 (Experiment No. 30), a precipitated silica filler Nipsil VN₃ having a specific surface area of about 230 m²/g, a process oil Sunpar 2280, zinc white, stearic acid, the same $\alpha,\omega$-dihydroxydimethylpolysiloxane fluid as used in Example 5, bis(trimethoxysilylpropyl) tetrasulfide, sulfur, mercaptobenzothiazole, tetramethylthiuram disulfide, zinc di-n-butyl-dithiocarbamate, 2-mercaptobenzimidazole and DCP-40, all in the amounts as indicated in Table IX.

The compositions thus prepared were each fabricated into sheets 2 mm thick by heating first at 160° C. for 20 minutes under a 100 kg/cm² pressure and then at 150° C. for 2 hours. The sheets were determined for hardness, ultimate elongation, tensile strength, compression set as thus heat-cured and also as having been aged at 180° C. for 15 days or at 200° C. for 3 days. The results are set out in Table IX.

Table IX

| Experiment No. | 25* | 26 | 27 | 28 | 29 | 30 |
|---|---|---|---|---|---|---|
| EP-43, parts | 97 | 90 | 70 | 70 | 60 | 70 |
| Organopolysiloxane, parts | 3 | 10 | 30 | 30 | 40 | 30 |
| Nipsil VN₃, parts | 55 | 55 | 55 | 30 | 55 | 55 |
| Sunpar 2280, parts | 15 | 15 | 15 | 12 | 15 | 12 |
| Zinc white, parts | 10 | 10 | 10 | 10 | 10 | 10 |

Table IX-continued

| Experiment No. | | 25* | 26 | 27 | 28 | 29 | 30 |
|---|---|---|---|---|---|---|---|
| Stearic acid, parts | | 1 | 1 | 1 | 1 | 1 | 1 |
| α, ω-Dihydroxydimethylpolysiloxane fluid, parts | | 5 | 5 | 5 | 3 | 5 | 5 |
| Tetrasulfide, parts | | 1.5 | 1.5 | 1.5 | 1.5 | 1.5 | 1.5 |
| Sulfur, parts | | 0.6 | 0.6 | 0.6 | 0.5 | 0.6 | 0 |
| Marcaptobenzothiazole, parts | | 1.7 | 1.7 | 1.7 | 1.5 | 1.7 | 0 |
| Tetramethylthiuram disulfide, parts | | 0.8 | 0.8 | 0.8 | 0.6 | 0.8 | 0 |
| Zinc di-n-buty-di thiocarbamate, parts | | 0.6 | 0.6 | 0.6 | 0.5 | 0.6 | 0 |
| 2-mercaptobenzimidazole, parts | | 0 | 0 | 0 | 0 | 0 | 2 |
| DCP-40, parts | | 0 | 0 | 0 | 0 | 0 | 5 |
| As cured | Hardness (JIS) | 70 | 68 | 66 | 54 | 65 | 69 |
| | Ultimate elongation, % | 600 | 710 | 531 | 780 | 602 | 622 |
| | Tensile strength, kg/cm² | 135 | 120 | 97 | 78 | 88 | 122 |
| | Compression set, % (105° C., 22 hours) | 90 | 56 | 40 | 35 | 28 | 12 |
| After 15 days at 180° C. | Hardness (JIS) | 86 | 75 | 71 | 58 | 70 | 76 |
| | Ultimate elongation, % | 85 | 160 | 345 | 380 | 364 | 270 |
| | Tensile strength, kg/cm² | 40 | 57 | 67 | 60 | 65 | 66 |
| After 3 days at 200° C. | Hardness (JIS) | 90 | 78 | 71 | 60 | 71 | 76 |
| | Ultimate elongation, % | (a) | 150 | 331 | 377 | 360 | 241 |
| | Tensile strength, kg/cm² | (a) | 40 | 51 | 55 | 60 | 45 |

(a): Too weak to be determined.

What is claimed is:

1. A rubber composition curable by heating into a rubbery elastomer comprising:
   (a) 100 parts by weight of a rubber blend composed of
      (a-1) from 50 to 95% by weight of an organic rubber which is one of natural rubber and an organic synthetic rubber, chosen from the group consisting of styrene-butadiene rubbers, butadiene rubbers, ethylene-propylene rubbers, ethylene-propylenediene terpolymer rubbers, butadiene-acrylonitrile rubbers, ethylene-vinyl acetate copolymer rubbers, and isobutylene-isoprene rubbers, and
      (a-2) from 50 to 5% by weight of an organopolysiloxane expressed by the average unit formula $$R_a Si O_{(4-a/2)}$$

where R is a substituted or unsubstituted monovalent hydrocarbon group and a is a number from 1.98 to 2.05 both inclusive, and having at least two functional units selected from the class consisting of mercapto groups and aliphatically unsaturated linkages in the molecule,
   (b) from 0.1 to 20 parts by weight of an organosilicon compound chosen from the group consisting of bis (trimethoxysilylpropyl) tetrasulfide, bis (methyldiethoxysilypropyl) tetrasulfide, (EtO)₃SiCH₂CH₂CH₂S₄CH₂CH₂CH₂Si(OEt)₃

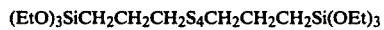

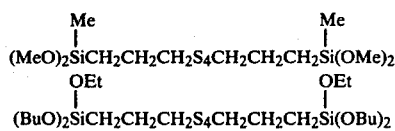

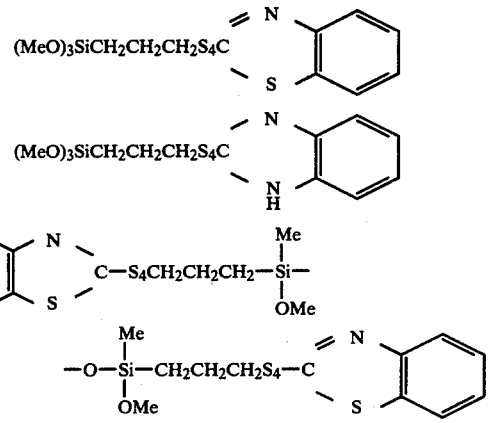

wherein Me, Et and Bu denote methyl, ethyl, and butyl groups, respectively,
   (c) from 50 to 200 parts by weight of a reinforcing siliceous filler having a specific surface area of at least 50 m²g, and
   (d) from 0.1 to 10 parts by weight of a curing agent chosen from the group consisting of sulfur, sulfur-containing organic compounds, organic peroxides, a combination of an organic peroxide and sulfur, and a combination of an organic peroxide and a sulfur-containing organic compound.

2. The rubber composition as claimed in claim 1 wherein the mercapto group in the component (a-2) is bonded to the silicon atom through a divalent organic group.

3. The rubber composition as claimed in claim 1 wherein from 0.1 to 1.0 mole % of the groups represented by the symbol R in the component (a-2) are mercapto-substituted organic groups and/or aliphatically unsaturated hydrocarbon groups.

4. The rubber composition as claimed in claim 1 wherein the organopolysiloxane as the component (a-2) has an average degre of polymerization of at least 100.

5. The rubber composition as claimed in claim 1 wherein the component (a) is composed of from 55 to 90% by weight of the component (a-1) and from 45 to 10% by weight of the component (a-2).

6. The rubber composition as claimed in claim 2 wherein the divalent group is a trimethylene group expressed by the formula $-CH_2CH_2CH_2-$.

* * * * *